April 26, 1966  D. J. BURKE  3,247,862
SAFETY T FITTING WITH CHECK VALVE
Filed April 17, 1963

INVENTOR.
DONALD J. BURKE
BY
*Head & Johnson*
ATTORNEYS

United States Patent Office 3,247,862
Patented Apr. 26, 1966

3,247,862
SAFETY T FITTING WITH CHECK VALVE
Donald J. Burke, Tulsa, Okla., assignor to Continental
Industries, Inc., a corporation of Oklahoma
Filed Apr. 17, 1963, Ser. No. 273,658
4 Claims. (Cl. 137—318)

This invention relates to a safety T fitting. More particularly, the invention relates to a T for affixing to a gas main for use in attaching a branch line to a gas main, the T having improved safety features. Still more particularly, the invention relates to a safety T fitting for affixing to a gas main for use in attaching a branch line to the gas main including means whereby a break in the branch line, or any other failure in the branch line causing excess gas flow will result in the closing of the line to prevent the further escape of gas.

A problem which has bothered the gas industry for many years is that of finding a means of preventing the escape of gas when a branch line, or some gas using fixture attached to it, breaks or otherwise becomes defective. A large volume of gas discharged accidentally can soon accumulate in any type of confined area and can be the source of an explosion and fire. This invention provides a fitting for the use in attaching a branch line to a gas main including means of preventing the escape of gas when a break occurs in the branch line.

It is therefore an object of this invention to provide a T fitting for use in attaching a branch line to a gas main including means within the T fitting of preventing the discharge through the T of gas in excess of a predetermined rate of flow.

Another object of this invention is to provide a safety T for attaching a branch line to a gas main including a flow limiting insert means which may be threaded into the T after it is affixed to the main, the flow limiting insert having the characteristic of preventing gas flow through the T in excess of a predetermined volume.

Another object of this invention is to provide a T for affixing to a gas main including flow limiting means within the T to prevent flow of gas through the T beyond a predetermined volume and further including self-enclosed valve means whereby gas flow to the branch line may be shut off.

Another object of this invention is to provide a safety T for a gas main having the characteristic of closing a branch line connected to the T when flow in the branch line exceeds a predetermined volume and having a further characteristic that the T may function as a valve to close the branch line, all accomplished in a T of great simplicity of construction and economy of manufacture.

These and other objects and a better understanding of the invention may be had by referring to the following description and claims, taken in conjunction with the attached drawings, in which:

This invention may be described as a safety T for use in connecting a branch line to a gas main. More particularly, the invention may be described as a safety T fitting for a gas main, said T fitting adaptable to be affixed to a gas main at an opening in the main, said T fitting comprising a tubular body member adaptable to be affixed substantially uprightly at one end thereof to said main at said opening in said main so that communication is provided between the interior of said main and the interior of said tubular body member, said tubular body member having an outlet opening therein intermediate the length thereof, said tubular body member having a valve seat forming opening restriction formed substantially axially therein between said outlet opening and said end adaptable for affixing to a main, and a valve ball loosely supported within said body member, below said valve seat forming opening restriction, said ball of a diameter larger than said valve seat forming opening restriction whereby gas flow exceeding a predetermined rate raises said ball to engage and close said valve seat forming opening, and means of closing the end of said tubular body member opposite said end affixed to said main.

Figure 1:
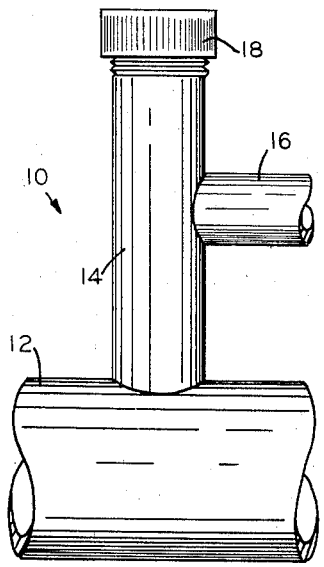
FIGURE 1 is an external view of the safety T of this invention affixed to a gas main.

Referring now to the drawings and first to FIGURE 1 the safety T fitting of this invention is indicated generally by the numeral 10 and is shown affixed to a gas main 12. The safety T 10 consists of an upstanding tubular body portion 14 having a branch connection 16 intermediate the length thereof. The lower end of the tubular body portion 14 is attached to the main 12, usually by welding, and the upper end of the tubular body portion 14 is closed, such as with an internally threaded pipe cap 18. Although the T 10 of this invention may be supported at various angles relative to the gas main 12, it is preferably mounted to extend vertically from the main.

Figure 2:
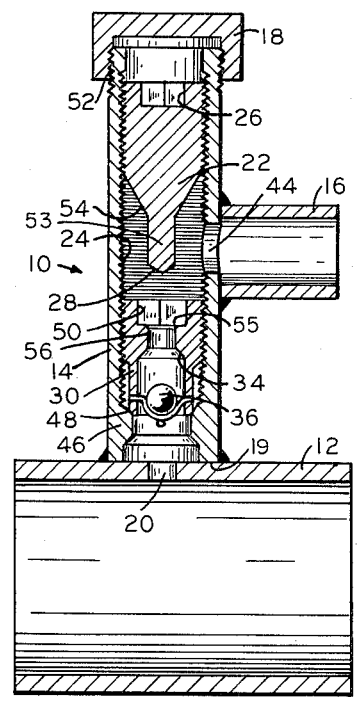
FIGURE 2 is a cross-sectional, slightly enlarged view of the safety T of this invention affixed to a gas main.
Figure 3:
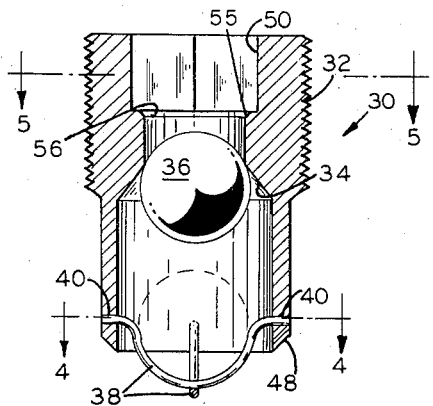
FIGURE 3 is an enlarged cross-sectional view of the flow limiting check member insert utilized in the safety T of this invention.
Figure 6:
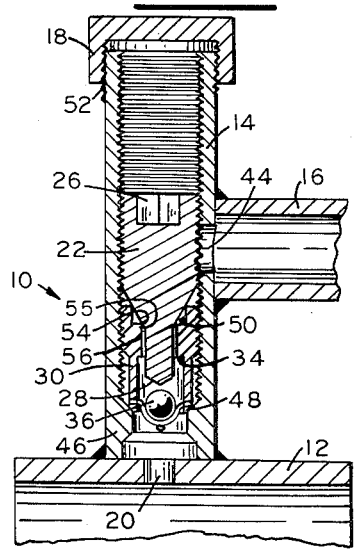
FIGURE 6 is a cross-sectional view of the safety T fitting affixed to a gas main showing the valve member in the downward position.
Figure 4:
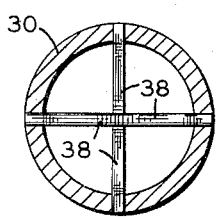
FIGURE 4 is a cross-sectional view taken along the line 4—4 of FIGURE 3 showing one embodiment of the ball retaining means of this invention.
Figure 5:
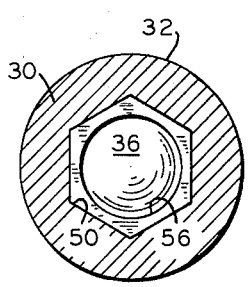
FIGURE 5 is a cross-sectional view of the flow limiting check member taken along the line 5—5 of FIGURE 3.

Referring now to FIGURE 2 the T is shown in cross-section in a slightly enlarged view. The T 10 is affixed at its lower end 19 to main 12 at an opening 20 in the main so that communication is provided between the interior of the main and the interior of the tubular body portion 14. The opening 20 may be formed in the main before the safety T 10 is affixed. This would ordinarily be the method used only if the gas main 12 did not have gas already supplied to it. Another method is to first affix the T by welding the lower end 19 of the tubular body portion 14 to the main 12. Opening 20 is then formed in the main. Opening 20 may be formed in several ways. One method is to lower a guide having an axial opening therein and a drill into the tubular body portion 14 (the cap 18 of course being first removed) and drilling the opening 20. An alternate method is to utilize a self-punching member 22 which is threadably advanced to penetrate main 20. The self-punching member is a cylindrical externally threaded element which threadably engages internal threads 24 in the tubular body portion 14. By means of a wrench engaging the hexagonal recess 26 in the upper end of the self-punching member 22 the punching member is threaded downwardly until the punching end 28 engages the main 12 and by the combination of the rotary and downward force applied by threads 24 opening 20 is formed in the main. When this method is utilized the self-punching member 22 is then removed from the tubular body portion 14 and a flow rate check member 30 is threaded into the tubular body portion 14. The flow rate check member 30 is shown best in the enlarged view of FIGURE 3 and consists of a tubular member, the upper or larger diameter portion of which is externally threaded at 32. Intermediate the length of the flow rate check member 30 is formed an internal lower ball seating shoulder 34. Loosely supported in the lower portion of the flow rate check member 30 is a ball 36 of an external diameter larger than the internal diameter of the seating shoulder portion 34. In the preferred embodiment a means of retaining ball 36 within the lower tubular portion of the check member 30 is provided. The ball retaining means may consist, as is shown in FIGURES 3 and 4, of formed wire members 38 extending diametrically across the interior diameter of the lower portion of the check member 30. The wire members 38 may extend into small openings 40. In the preferred embodiment two formed wire members 38 are utilized at right angles to each other and are curved to receive the ball 36 in a cup like arrangement so that it is loosely supported axially within the lower portion of the check member 32. Other means of supporting ball 38 loosely within the lower portion of the check 30 are readily suggestible such as by means of a single straight wire extending between openings 40. In its simplest embodiment the invention would require no supporting means at all, the ball 36 merely being loosely positioned in the lower portion of the tubular body portion 14.

Referring back to FIGURE 2 it can be seen that an outlet opening 44 is formed in the tubular body portion 14 to communicate the interior thereof with the branch connection 16. Integrally formed in the interior of the tubular body portion 14 is a seating shoulder 46 which is engaged by a lower external seating surface 48 formed on the lower end of the check member 30. When the check member 30 is downwardly threadably advanced the engagement of the lower external seating surface 48 against seating shoulder 46 insures a leak proof seal between the check member 30 and tubular body portion 14. The check member 30 is provided with a square or hexagonal tool receiving recess 50 by which the check member is threaded into the tubular body portion 14 and in seating engagement with the seating shoulder 46. The upper external end of the tubular body member 14 is provided with threads 52 to receive the cap 18 as a means of closing the upper end of the tubular body member.

OPERATION

Tubular body portion 14 of the safety check 10 is first affixed to a gas main 12. If an opening 20 is not already formed in the main then an opening is formed as has previously been described such as by the use of a drill or a self punching member. After the opening 20 is formed, the check member 30 is threadably inserted into the tubular body portion 14 to securely seat against the seating shoulder 46. A cap 18 is utilized to close the upper end of the tubular body member and after a branch line is connected to branch connection 16 the safety T is ready for service. When gas pressure is applied to gas main 12 normal gas flow will take place through opening 20, past ball 36 through the check valve 30, through opening 44 and out branch outlet 16. The ball 36 is designed of sufficient diameter and weight so that normal gas flow does not disturb the ball but permits it to remain in its normal position, such as seated in the pocket of formed wire members 38. If a break or opening occurs in the branch line connected to branch connection 16 so that excessive gas flow occurred, the volume of movement of gas past ball 36 raises it to engage seating shoulder 34 of the check member 30. Gas flow through the safety T is thereby stopped. No further flow of gas in any volume will occur as long as pressure differential exists between the gas pressure in the main 12 and that in the branch connection 16. When the breaks or other condition permitting excessive gas flow in the branch line is repaired and closed, any small seepage of gas past the ball 36 will eventually result in an equalization of pressure between the gas main 12 and the branch line so that, with the pressure equalized, ball 36 will fall back to its normal position and subsequently permit normal gas flow. In practice it is desirable to provide a small notch in the valve seating shoulder 34 to provide a bleed-by of gas of approximately two to five cubic feet per hour. Such a small flow of gas is insufficient to result in a dangerous gas discharge from a broken line but is sufficient to pressure up a repaired line to permit ball 36 to return to its rest position.

An alternate method of utilizing the safety T of this invention is as follows. The safety T 10 is affixed, such as by welding, to a gas main 12. A self-punching member 22 is inserted in the T and by threaded advancement the punching end 28 forms opening 20 in the gas main. The self-punching member 22 may then be completely withdrawn from the tubular body member 14 and the flow rate check member 30 may then be inserted, and secured in sealed engagement with the seating shoulder 46. The self-punching member 22, which has been previously used for forming opening 20 in the gas main, may then be threaded into the tubular body portion 14 and left in the upper portion thereof, as shown in FIGURE 2. Cap 18 is then threaded on and the safety T is ready for service. As long as a gas flow rate below the predetermined upper limit occurs ball 36 will remain in its lower position. Should a greater flow rate occur, ball 36 will be raised to seal against the seating surface 34 of the check member 30 to prevent further flow.

The self-punching member 22 in the upper portion of the tubular portion 14 has two purposes other than its original use for forming the opening 20. First, if a break does occur in the branch line connected to branch connection 16 so that ball 36 is moved into seating engagement with seating surface 34, as previously described, the ball 36 will remain in such position until an equalization, or at least a near equalization of pressure occurs to permit the ball 36 to fall freely back to its rest position. An equalization of pressure can occur in only one of two ways. If the branch line attached to branch connection 16 is completely closed and a small leakage of gas occurs past ball 36 then gas pressure will eventually accumulate in the gas branch line so that it equalized with pressure in the main permitting ball 36 to fall into a normal unseated position. This may require some length of time and depends upon a small leakage. However, cap 18 may be removed and the self-punching member advanced so that the punching end 28 of the reduced diameter downwardly extending end portion 53 engages the ball 36 and forces it downwardly away from the seating surface 34. This will permit gas to immediately flow past the ball and into the branch outlet 16 so that gas service can be immediately restored as soon as the break in the branch line is repaired. As soon as a sufficient volume of gas flows to equalize the pressure in the branch line the self-punching member 22 may be withdrawn into its upward position as shown in FIGURE 2 and cap 18 replaced.

A second use of the self-punching member 22 is as follows: In the event it is necessary to completely close gas flow to a branch line affixed to branch connection 16, the self-punching member 22 may be advanced so that an intermediate tapered portion 54 engages an upper internal seating surface 55 of opening 56 in the flow rate check member 30 to completely seal it. In this manner, the flow of gas through the T is closed. Thus the self-punching member 22 serves as a valve member. This will permit any work necessary to be accomplished on the branch line connected to the branch connection 16. When the branch line is in condition to receive gas, the self-punching member 22 may be retarded into its upward position to permit normal gas flow past ball 36. The check member 30 is so designed that when the self-punching member 22 is advanced downwardly to function as a valve, as above described, the punching member 28 will not engage the ball 36 seated on the formed wire member 38. Thus, the safety T of this invention utilized the self-punching member 22 for three different functions, that is; (1) to punch an opening 20 in a gas main 12: (2) To displace ball 36 to permit the immediate restoration of gas service after the ball has closed to prevent the flow of an abnormal amount of gas; and (3) To serve as a valve whereby all flow of gas through the T is eliminated.

In its simplest embodiment it can be seen that the flow rate check member 30 may be integrally formed within the tubular body portion 14, that is, a valve seat forming opening restriction may be formed directly in the body member such as by the provision of an internal annular seating shoulder similar to seating shoulder 46 with the ball 36 loosely supported below it. The illustrated embodiment is preferred wherein the check member 30 is a separate removable component since any difficulty which arises with this element may be corrected by removing it and replacing it with a new element. In addition, if an integral seating means is provided in tubular body member 14 in place of the removable flow rate check member 30, ball 36 must be placed in position before the T is welded to the gas main, providing an undesirable opportunity for the ball to be damaged and thereby impaired in its safety shut-off function. When an integral seating shoulder is utilized in place of the preferred removable flow rate check member 30, the self-punching member 22 cannot be utilized for the punching of opening 20 since the ball 36 would be in the way. For all of these reasons the use of the removable flow rate check member is highly preferred.

Although the invention has been described with a certain degree of particularity it is manifest that many changes may be made in the details of construction in the arrangements of components without departing from the spirit and scope of this disclosure.

What is claimed:

1. A safety T fitting, said T fitting adaptable to be affixed to a gas main at an opening in the main, said T fitting comprising:

a tubular body member adaptable to be affixed substantially uprightly at the lower end thereof to said main at said opening in said main, said tubular body member having an outlet opening therein intermediate the length thereof, and an internal annular seating shoulder therein below said outlet opening and adjacent said lower end, said tubular body member having threads formed internally thereof from the upper end to substantially said seating shoulder;

a tubular, externally threaded flow rate check member threadably positioned within said tubular body member between said opening therein and said lower end thereof, said check member having an internal seating surface in the lower portion thereof and an external annular seating surface on the lower end thereof whereby said check member is threadably advanceable to sealable engagement with said body internal annular seating shoulder;

a ball retaining means affixed to the lower portion of said check member including a tubular portion, said ball retaining means being adapted to loosely support a ball substantially axially of said check member and below said internal seating surface;

a valve ball loosely supported within said ball retaining means, said ball of a diameter larger than the opening of said tubular check member and forming with said tubular portion a restricted passage whereby gas flow exceeding a predetermined rate will raise said ball to sealably engage said seating surface thereof to close said opening therethrough; and means closing the upper end of said tubular body member.

2. A safety T fitting according to claim 1 wherein said check member is provided with an internal upper seating surface and said fitting is provided with an externally threaded cylindrical valve member having an integral lower tapered portion, said valve member threadably received within the upper portion of said tubular member, the tapered portion adaptable when said valve member is threadably downwardly advanced to engage said internal upper seating surface of said check member to thereby seal against gas flow past said shoulder portion, said valve member having a tool receiving means at the upper end thereof.

3. A safety T fitting according to claim 2 wherein said valve member is an externally threaded cylindrical member having a lower integral intermediate tapered portion and an integral reduced diameter downwardly extending end portion having a diameter less than the tubular opening of said flow rate check member, said intermediate tapered portion adaptable to engage said internal upper seating surface of said flow rate check member to seal against gas flow therepast when said valve member is downwardly threadably advanced, said downwardly extending end portion extending through said tubular opening in said flow rate check member to displace said ball away from said flow rate check member as said valve member is threadably downwardly advanced.

4. A safety T fitting according to claim 3 wherein said integral reduced diameter downwardly extending end portion of said valve member terminates in a punching end configuration.

References Cited by the Examiner

UNITED STATES PATENTS

| 675,665 | 6/1901 | McCanna. | |
|---|---|---|---|
| 692,808 | 2/1902 | Wemmer. | |
| 869,878 | 11/1907 | Bruckner. | |
| 1,343,043 | 6/1920 | Ernst. | |
| 1,523,575 | 1/1925 | Beloit | 137—533.13 X |
| 2,983,477 | 5/1961 | Merrill | 137—318 X |
| 3,038,484 | 6/1962 | Smith | 137—318 X |
| 3,094,137 | 6/1963 | Burke | 137—318 |
| 3,159,167 | 12/1964 | Mueller | 251—65 X |

ISADOR WEIL, *Primary Examiner.*

WILLIAM F. O'DEA, *Examiner.*